United States Patent
Pink et al.

(10) Patent No.: US 10,513,261 B2
(45) Date of Patent: Dec. 24, 2019

(54) DANGER DETECTION IN AN INTENDED LANE CHANGE

(71) Applicant: Robert Bosch GmbH, Stuttgart (DE)

(72) Inventors: Oliver Pink, Ditzingen (DE); Oliver F. Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 16/032,934

(22) Filed: Jul. 11, 2018

(65) Prior Publication Data
US 2019/0023268 A1    Jan. 24, 2019

(30) Foreign Application Priority Data

Jul. 18, 2017 (DE) ........................ 10 2017 212 277

(51) Int. Cl.
*B60W 30/095* (2012.01)
*B60W 30/08* (2012.01)
(Continued)

(52) U.S. Cl.
CPC ........ *B60W 30/0956* (2013.01); *B60W 30/08* (2013.01); *B60W 30/09* (2013.01); *B60W 30/0953* (2013.01); *B60W 30/18163* (2013.01); *B60W 40/04* (2013.01); *B60W 40/10* (2013.01); *B60W 50/14* (2013.01); *G05D 1/0088* (2013.01); *G06K 9/00805* (2013.01); *G06K 9/00825* (2013.01); *G08G 1/167* (2013.01); *B60W 2050/143* (2013.01); *G05D 2201/0213* (2013.01)

(58) Field of Classification Search
None
See application file for complete search history.

(56) References Cited

U.S. PATENT DOCUMENTS 9,475,491 B1   10/2016   Nagasaka et al.
2009/0212930 A1*   8/2009   Pfeiffer .................. B60Q 9/008
                                                   340/435

(Continued)

FOREIGN PATENT DOCUMENTS

DE    102010054221 A1 *   8/2011   ............ B60K 35/00
DE    102013005248 A1    10/2014
(Continued)

*Primary Examiner* — Genna M Mott
*Assistant Examiner* — Melanie J Patrick
(74) *Attorney, Agent, or Firm* — Norton Rose Fulbright US LLP; Gerard Messina (57) ABSTRACT

A method for ascertaining the danger potential of a lane change of an ego vehicle from the currently used traffic lane to an adjacent traffic lane, a detection range in the external space of the ego vehicle being monitored, and the effect of objects identified in the detection range on the danger potential is evaluated, and based on positions and speeds of internal other vehicles identified in the detection range, it is determined whether external other vehicles located outside the detection range are able to reach a target region in which the ego vehicle is located following the intended lane change. A method for the at least partially automated control of an ego vehicle, in which in the case of an intended lane change, the danger potential of this lane change is evaluated, and the lane change is prevented if external other vehicles are able to reach the target region.

19 Claims, 8 Drawing Sheets

(51) Int. Cl.
*B60W 40/04* (2006.01)
*G08G 1/16* (2006.01)
*B60W 40/10* (2012.01)
*B60W 30/09* (2012.01)
*B60W 30/18* (2012.01)
*B60W 50/14* (2012.01)
*G05D 1/00* (2006.01)
*G06K 9/00* (2006.01)

(56) References Cited

U.S. PATENT DOCUMENTS

| | | | | |
|---|---|---|---|---|
| 2016/0059858 | A1* | 3/2016 | Heinrich | B60W 30/18163 701/23 |
| 2017/0232970 | A1* | 8/2017 | Schaper | B60W 30/18163 701/36 |
| 2018/0281785 | A1* | 10/2018 | Berntorp | G08G 1/166 |
| 2019/0009784 | A1* | 1/2019 | Takeda | B60T 7/12 |

FOREIGN PATENT DOCUMENTS

| | | |
|---|---|---|
| DE | 102015208007 A1 | 11/2016 |
| EP | 1858745 A1 | 11/2007 |
| WO | 2007014633 A1 | 2/2007 |
| WO | 2016081488 A1 | 5/2016 |

* cited by examiner

DANGER DETECTION IN AN INTENDED LANE CHANGE

CROSS REFERENCE

The present application claims the benefit under 35 U.S.C. § 119 of German Patent Application No. DE 102017212277.3 filed on Jul. 18, 2017, which is expressly incorporated herein by reference in its entirety.

FIELD

The present invention relates to a method for ascertaining the danger potential of an intended lane change, which method may be used both for assisting human drivers and for at least partially automated driving.

BACKGROUND INFORMATION

When traveling on superhighways and expressways, errors during a lane change frequently lead to dangerous situations. Vehicles traveling in the passing lane are suddenly forced to slam on the brakes because of vehicles merging in front of them, or an accident may even happen.

A frequent cause is that the differences in speeds between the currently used traffic lane and the traffic lane to which a change is intended are underestimated. For example, a driver who initiates a passing maneuver of a truck traveling at 80 km/h possibly may not realize that the vehicle approaching in the passing lane is traveling at a speed of 250 km/h. Speed differences of more than 100 km/h may also arise when the traffic in one lane slows down in front of an obstacle and a driver tries to merge with the traffic in the other lane which is moving at a normal speed.

European Patent No. EP 1 858 745 B1 describes a lane-change assistant, which recognizes an intended lane change to an adjacent traffic lane, detects other vehicles in this adjacent traffic lane, and evaluates the collision risk. Warnings and other measures are initiated as a function of the collision risk.

U.S. Pat. No. 9,475,491 B1 describes a system that, in the case of an autonomously driving vehicle, detects gaps between vehicles traveling in an adjacent traffic lane and appropriately controls the change to this adjacent traffic lane.

PCT Application No. WO 2007/014 633 A1 describes a lane-change assistant, which recognizes when the detection range of the environment monitor is partially shadowed. The assistant deactivates itself in such a case and informs the driver of this fact.

PCT Application No. WO 2016/081 488 A1 describes a system for evaluating intended lane changes, which can reliably assess the collision risk with another vehicle approaching very rapidly even if the exact angular position of the other vehicle in relation to the ego vehicle, and thus the traffic lane currently used by the other vehicle, is not able to be ascertained.

SUMMARY

Within the scope of the present invention, a method was developed for ascertaining the danger potential of a lane change of an ego vehicle from the currently used traffic lane to an adjacent traffic lane. In this method a detection range in the external space of the ego vehicle is monitored, and the effect that objects identified in the detection range have on the danger potential is evaluated.

Using positions and speeds of internal other vehicles identified within the detection range, it is evaluated whether external other vehicles located outside the detection range are able to reach a target region in which the ego vehicle will be located following the intended lane change.

In this context, the expression 'able to reach' should particularly be understood to indicate that the intended lane change causes a conflict between the ego vehicle and the external other vehicle in the target area. The fact that the external other vehicle must change lanes in order to avoid a collision or in order to maintain the safety distance to the ego vehicle, or that it must be decelerated beyond the extent encountered in cooperative driving, is evaluated as a conflict in this context. For instance, it may be expected from the driver of a rapidly approaching vehicle that the driver takes his foot off the accelerator or brakes lightly when the ego vehicle switches to his lane.

The constellation of the internal other vehicles detected in the detection range in many cases allows a reliable conclusion to the effect that external other vehicles are not able to reach the target region. This applies especially when it is assumed that in line with a usual traffic situation,

- both longitudinal (in the driving direction) and lateral (side) accelerations and decelerations are physically restricted to maximum values,
- the road users exhibit a cooperative behavior and do not deliberately cause any dangerous situations, and
- traffic rules and speed restrictions are essentially observed, e.g., illegal passing on the right does not occur or the legal maximum speed is not exceeded by more than 30%.

In other words, in order to avoid conflicts with rapidly approaching other vehicles, the capability of detecting and tracking these other vehicles is no longer required. At speeds of 250 km/h and more, this would necessitate a detection radius of at least 300 m, which is beyond the capabilities of many of the currently employed sensors.

In addition, the danger potential is also able to be assessed in situations in which the unimpeded view of other vehicles is restricted. For example, if a passing maneuver on a highway is planned, then the speed of the ego vehicle and the speed of a possible other vehicle in the oncoming traffic add up to an approach speed that is comparable to the initially mentioned differential speeds on superhighways. If the highway then leads to a road ridge or to a bend, for instance, then the assessment of the danger potential must first be based on the least favorable case, i.e., that a fast other vehicle is located directly behind the road ridge or the bend. For example, if the presence of a considerably slower tractor in the oncoming lane then hampers the approach of such a fast other vehicle, a safe passing maneuver may be possible.

The ascertaining of the danger potential may be used in assistance systems for assisting a human driver, for instance. To do so, in a particularly advantageous further embodiment of the present invention, the intention of the driver of the ego vehicle to carry out a lane change is detected, e.g., by monitoring the steering angle. A warning is output to the driver if the danger potential exceeds a predefined threshold value. This makes it possible to defuse the initially mentioned dangerous situations in which the driver has misjudged a speed difference. The warning may be output haptically via an electromotor, for example, or also via a force effect on the steering wheel of the ego vehicle, which modifies the steering resistance.

It may happen, especially under excellent visual conditions, that the optical range in the direction of possible other vehicles extends considerably beyond the detection range able to be monitored by the technical devices. It may then be perceived as annoying if a warning is output despite the fact that it is visually quite obvious to the driver that no other vehicle with which a conflict could arise after the intended lane change is to be found as far as the eyes can see. On the other hand, poorer visibility might tempt the driver to undertake a possibly dangerous lane change, for instance because the driver perceives only the wall of fog but not the other vehicle located immediately behind that wall. Therefore, in a further, particularly advantageous embodiment of the present invention, the optical range is monitored in the direction of possible external other vehicles, and the warning is output only if the optical range ends within the detection range.

However, the ascertainment of the danger potential according to the present invention may also be used in a particularly advantageous manner in the at least partially automated control of the ego vehicle. The lane change will then be prevented whenever external other vehicles are able to reach the target region. This driving behavior is very conservative given the usual driving behavior of human drivers but offers the certainty that no conflict with a rapidly approaching other vehicle is able to arise in the external space of the ego vehicle despite the restricted detection range.

In a particularly advantageous embodiment of the present invention, the target region is deemed reachable by external other vehicles if either no internal other vehicle is detected in the adjacent traffic lane between the target region and a boundary of the detection range or if an internal other vehicle is detected at such a great distance that an external other vehicle is able to overtake the internal other vehicle and will still be able to merge into the adjacent traffic lane before reaching the target region. This is contra-intuitive in comparison with the usual behavior of human drivers. From the point of view of the human driver, the lane change seems particularly safe especially when the driver either does not notice any other vehicle or if another vehicle is located at a very great distance. However, it may happen, especially during at least partially automated driving, that the detection range in the external space of the ego vehicle is smaller than the minimum distance from some other vehicle approaching in the adjacent lane required for a safe lane change.

In a situation such as this, an internal other vehicle may "shield" the target region from the rapidly approaching external other vehicle, so to speak. Already due to the presence of the internal other vehicle, the external other vehicle is forced to change lanes or to reduce its speed. Therefore, the intended lane change of the ego vehicle is not the reason for the required change in the behavior of the external other vehicle.

A similar situation is encountered when an internal other vehicle is driving ahead in the adjacent traffic lane. In order to maintain the prescribed safety distance from the internal other vehicle, an external other vehicle that is approaching much more rapidly must change lanes or reduce its speed. The moment at which this must take place is not advanced in time, or not substantially advanced, when the ego vehicle merges onto the adjacent lane directly behind the internal other vehicle. This is also possible without dropping below the required safety distance between the ego vehicle and the internal other vehicle since both vehicles are moving at similar speeds and the required distance is therefore correspondingly smaller.

In a further, particularly advantageous embodiment of the present invention, a predefined region behind an internal other vehicles traveling in front in the adjacent traffic lane is evaluated as not being reachable or as being reachable only to a limited extent by external other vehicles. In particular, the size of this region may be ascertained from the speeds of the ego vehicle and the internal other vehicle in conjunction with the rule regarding the safety distance.

The described conservative driving behavior, in particular during at least partially automated driving, may result in the the ego vehicle having to follow a slower vehicle over a longer period of time when no further vehicles are identified in the detection range. This also does not interfere with the trailing traffic because it is only important that the traffic lane is occupied by at least one vehicle, and not by how many. However, when a passing maneuver has taken place, then a speedy return to the traffic lane used prior to the passing maneuver is desirable in order to free up the passing lane again. A vehicle remaining there for a longer period of time is perceived as quite annoying by drivers of following, faster vehicles, and the irritation of these drivers increases even further if the annoying vehicle is a vehicle that is driving in an at least partially automated manner and does not respond to aggression via the horn, headlight flashing or tailgating. In order to avoid such situations, a predefined region in front of an internal other vehicle that has been passed by the ego vehicle is evaluated as being unreachable by external other vehicles in a further, particularly advantageous embodiment of the present invention.

In a further especially advantageous embodiment of the present invention, the traffic lane is modeled as a graph in which nodes represent the positions of vehicles and in which edges represent possible movements of vehicles. In particular the edges may include probabilities for the respective movements. This particularly makes it possible to realize assumptions or also traffic rules that exclude certain movements in a transparent manner.

The graph in particular may be a spatiotemporal graph in which the nodes represent the positions of vehicles at certain points in time.

In one further, particularly advantageous embodiment of the present invention, the behavior of other vehicles is assumed to be cooperative to the extent that they are not switching to the traffic lane currently used by the ego vehicle. This is a considerable simplification, which provides corresponding savings in processing time. It is not necessary to intercept every non-cooperative behavior of other drivers. Instead, such a driver must blame himself if his behavior ultimately requires an evasive maneuver or heavy braking.

The present method may utilize sensors or control units that are already provided, especially in vehicles that drive in an at least partially automated manner. The corresponding hardware must therefore not be modified in order to reap the described benefits. Instead, the present method may partially or even completely be implemented in a software that is able to be provided as a supplement in the form of an add-on to an existing control system and to that extent, represents a product that may be sold as a separate item. The present invention therefore also pertains to a computer program having machine-readable instructions that, when executed on a computer and/or on a control unit, induce the computer and/or the control unit to execute a method according to the present invention. In the same way, the present invention also pertains to a machine-readable data carrier on which the computer program is stored.

Additional measures that improve the present method will be illustrated in greater detail in the following text together with the description of the preferred exemplary embodiments of the present invention on the basis of figures.

DETAILED DESCRIPTION OF EXAMPLE EMBODIMENTS

Figure 1:
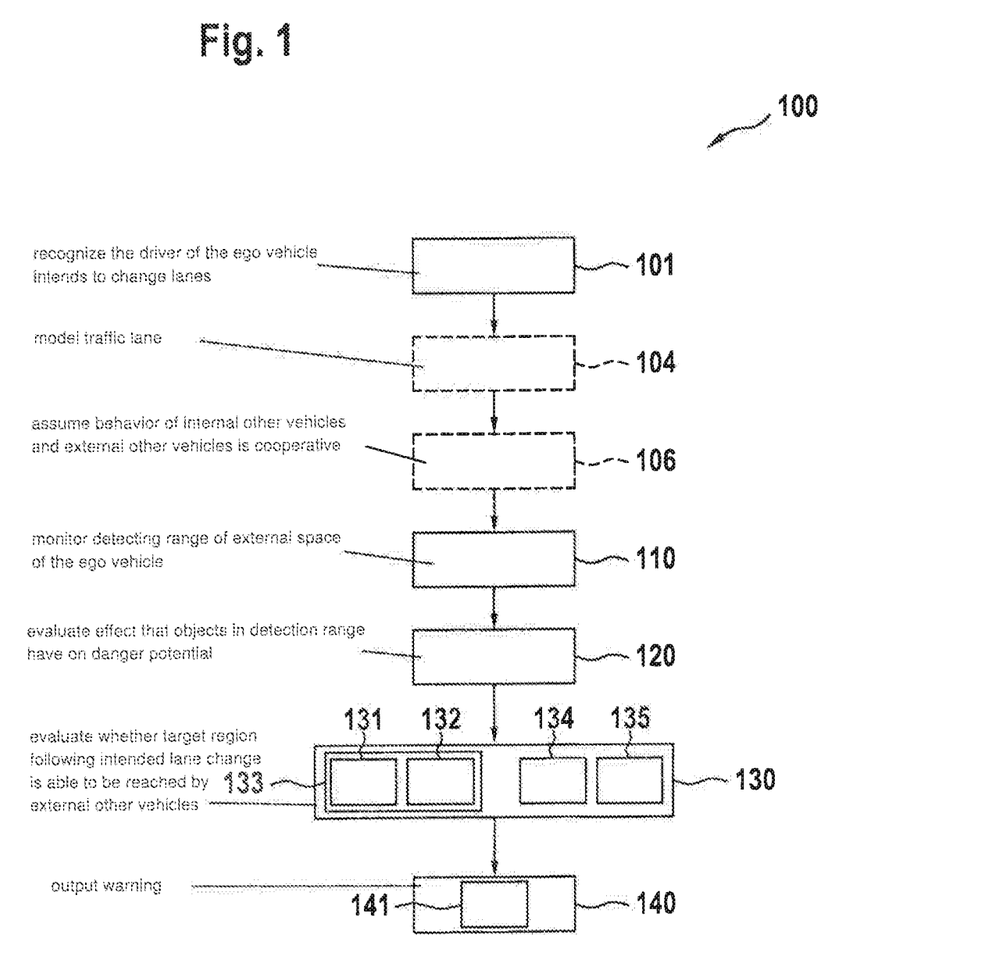
FIG. 1 shows an exemplary embodiment of method 100 for ascertaining the danger potential.

The exemplary embodiment of method 100 shown in FIG. 1 is used for assisting a human driver, and thus begins in step 101 with the recognition that the driver of ego vehicle 1 intends to change lanes. This step 101 is omitted in the case of an autonomously driving ego vehicle 1 or a vehicle that is driving in an at least partially automated manner.

Optionally, traffic lane 2a-2c is modeled as a graph 7 in step 104. Also optionally, in step 106 the assumption is made that the behavior of internal other vehicles 4 and external other vehicles 6 is cooperative.

In step 110, detection range 3 in the external space of ego vehicle 1 is monitored. In step 120, the effect that objects 4 detected in detection range 3 have on the danger potential is evaluated.

In step 130, it is then evaluated in accordance with a predefined system of rules, on the basis of positions and speeds of internal other vehicles 4 detected in detection range 3, whether target region 5 in which ego vehicle 1 is located following the intended lane change is able to be reached by external other vehicles 6 located outside detection range 3.

For example, if no vehicle is detected between target region 5 and a boundary 3a of detection region 3 according to block 131, then target region 5 will be evaluated as reachable by external other vehicles 6 according to block 133. According to block 132, the same applies if an internal other vehicle 4 is detected at such a great distance that an external other vehicle 6 is able to overtake internal other vehicle 4 and merge into adjacent traffic lane 2a, 2b, 2c even before reaching target region 5.

On the other hand, according to block 134, a predefined region 4a behind an internal other vehicle driving ahead in adjacent traffic lane 2a, 2b, 2c is evaluated as not reachable by external other vehicles 6.

In addition, according to block 135, a predefined region 4b in front of an internal other vehicle 4 that was passed by ego vehicle 1 is evaluated as not reachable by external other vehicles 6.

In the exemplary embodiment shown in FIG. 1, where method 100 is used to assist a human driver, the optical range is monitored in the direction of possible external other vehicles 6 according to block 141. If the optical range ends within detection region 3, then a warning is output to the driver in step 140 in the event that the danger potential ascertained in step 130 exceeds a predefined threshold value.

Figure 2:
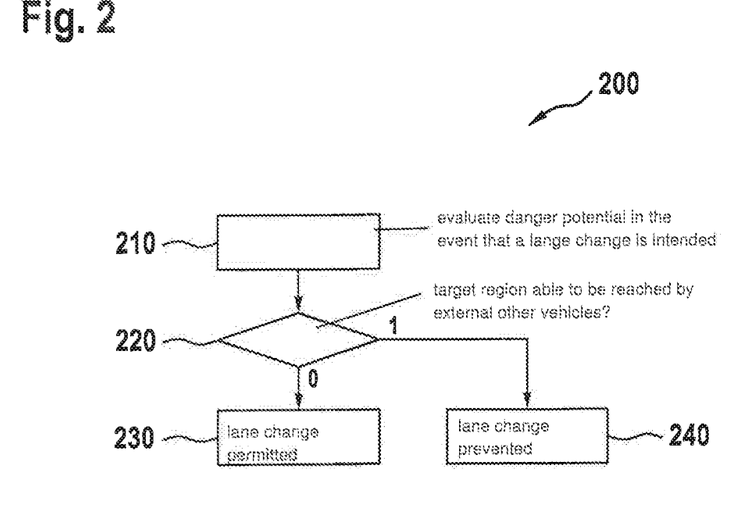
FIG. 2 shows an exemplary embodiment of method 200 for the at least partially automated control of an ego vehicle 1.

If ego vehicle 1 is an autonomously driving vehicle or a vehicle driving in an at least partially automated manner, then the method outlined in FIG. 2 is carried out instead of steps 101 and 140 shown in FIG. 1. According to step 210, as described in FIG. 1, the danger potential is evaluated in the event that a lane change is intended. In step 220, it is checked whether target region 5 in which ego vehicle 1 will be located following the lane change is able to be reached by external other vehicles 6. If this is not the case (truth value 0), then the lane change will be permitted in step 230. In the other case (truth value 1), the lane change is prevented in step 240.

FIG. 3 shows a number of exemplary scenarios and the associated danger assessment.

Figure 3A:
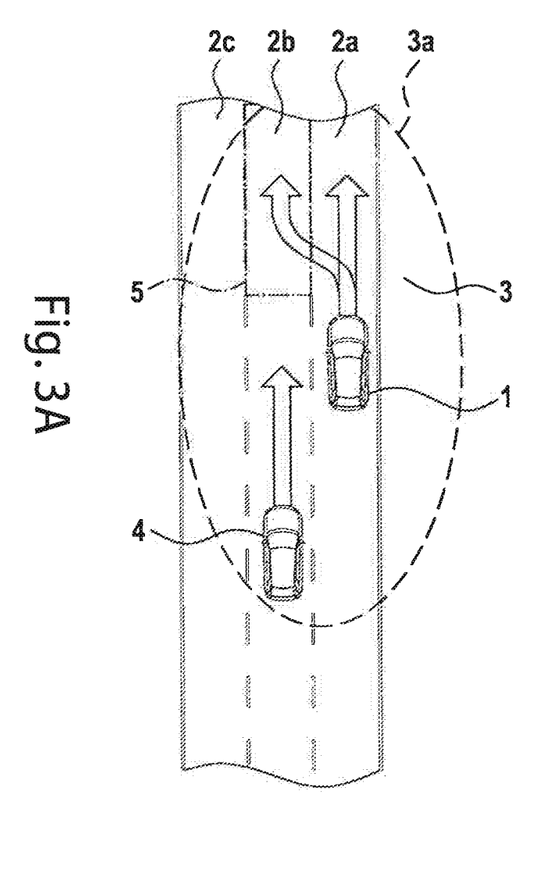
FIGS. 3A, 3B, 3C, 3D, and 3E show examples of constellations of ego vehicle 1, internal other vehicle 4, and external other vehicle 6.

In FIG. 3A, an internal other vehicle 4 is located inside detection range 3. Internal other vehicle 4 is located at such a distance from ego vehicle 1 and moves at such a speed that the entrance of ego vehicle 1 into target region 5 with the lane change from right traffic lane 2a to center traffic lane 2b does not lead to a conflict with internal other vehicle 4. At the same time, the presence of internal other vehicle 4 shields target region 5 from fast external other vehicles 6 since the latter are unable to drive through internal other vehicle 4.

Figure 3B:
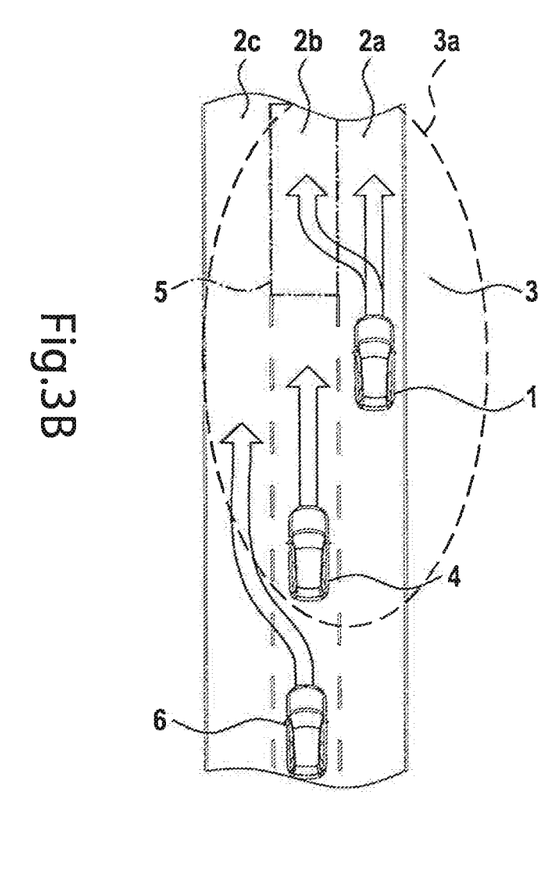

This effect is sketched in FIG. 3B. In this instance, an external other vehicle 6 is present. In order not to undershoot the safety distance from slower internal other vehicle 4, external other vehicle 6 must either change from center traffic lane 2b to left traffic lane 2c, as shown in FIG. 3B, or it must reduce its speed.

Figure 3C:
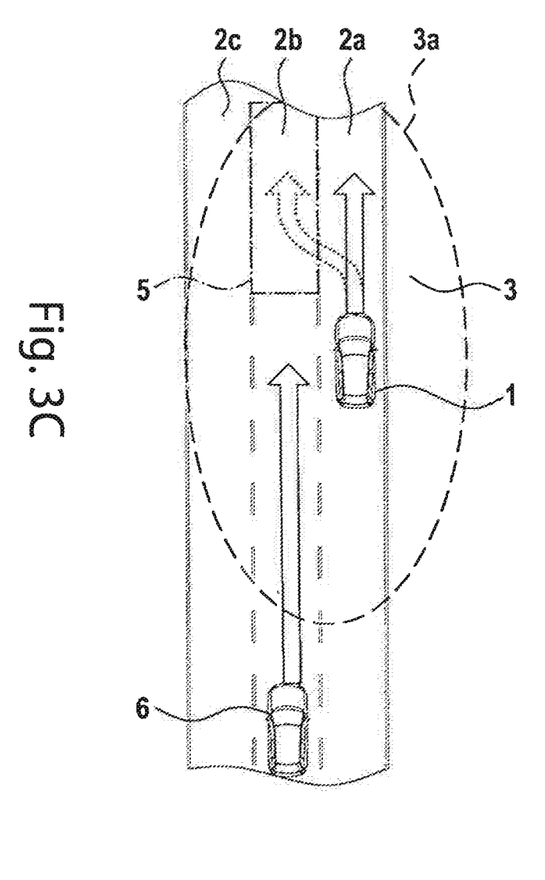

FIG. 3C shows a similar situation as FIG. 3B, with the important difference that no internal other vehicle 4 was detected between target region 5 and boundary 3a of detection range 3. In this case, fast external other vehicle 6 is not prevented from reaching target region 5, and a conflict with ego vehicle 1 may therefore occur in such a situation. As a result, the lane change is prevented in this case, which is symbolized by the dashed lines of the arrow from ego vehicle 1 to target region 5.

Figure 3D:
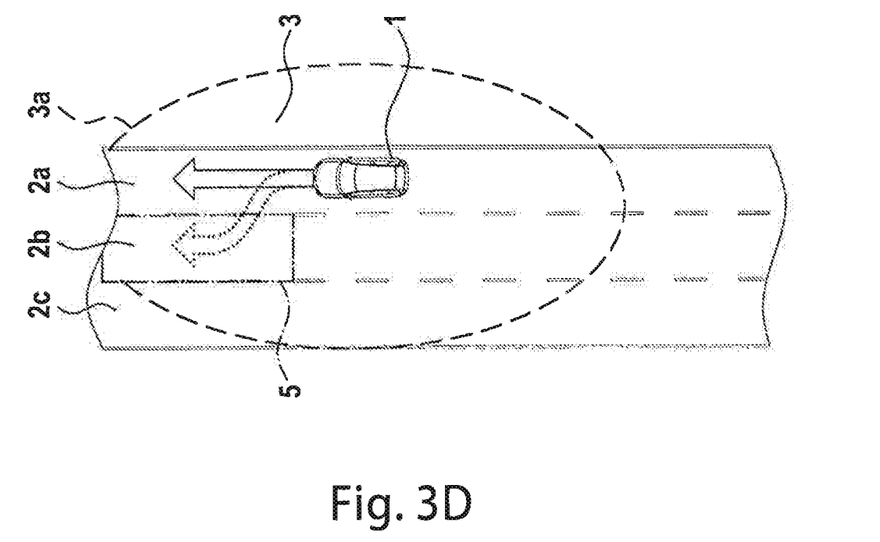

According to FIG. 3D, this applies regardless of whether or not an external other vehicle 6 is actually present. Because of the limited extension of detection range 3, ego vehicle 1 is not able to distinguish between the scenarios sketched in FIGS. 3C and 3D.

Figure 3E:
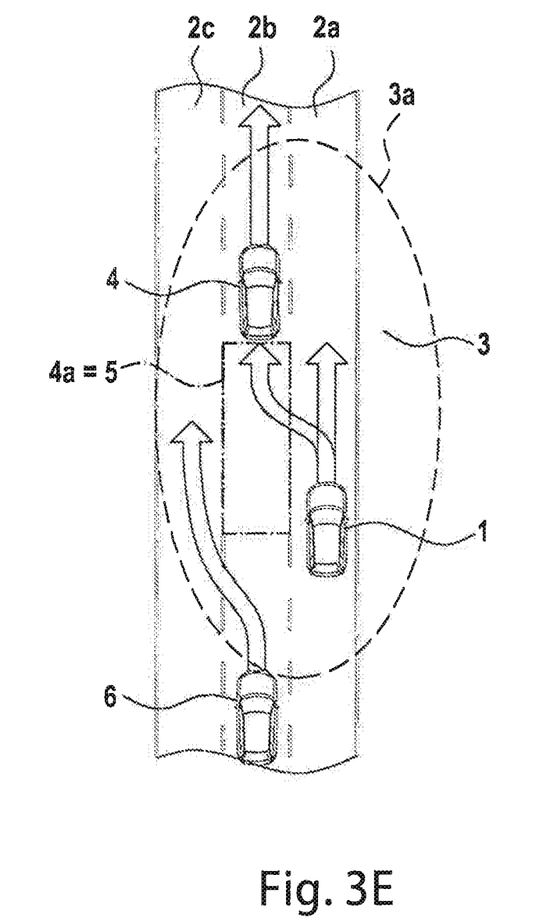

FIG. 3E shows another scenario in which an internal other vehicle 4, which is moving at a similar speed as ego vehicle 1, travels ahead in center lane 2b. Region 4a directly behind the internal other vehicle is taboo for a possible fast external other vehicle 6 because the safety distance from internal other vehicle 4 prescribed for its speed would be undershot. Thus, if a fast external other vehicle 6 should approach, its driver is obligated to change to left lane 2c or else to reduce the speed. Region 4a, which corresponds to target region 5 for the lane change of ego vehicle 1, is therefore always unoccupied. As a result, ego vehicle 1 may change from right lane 2a to center lane 2b.

Figure 4A:
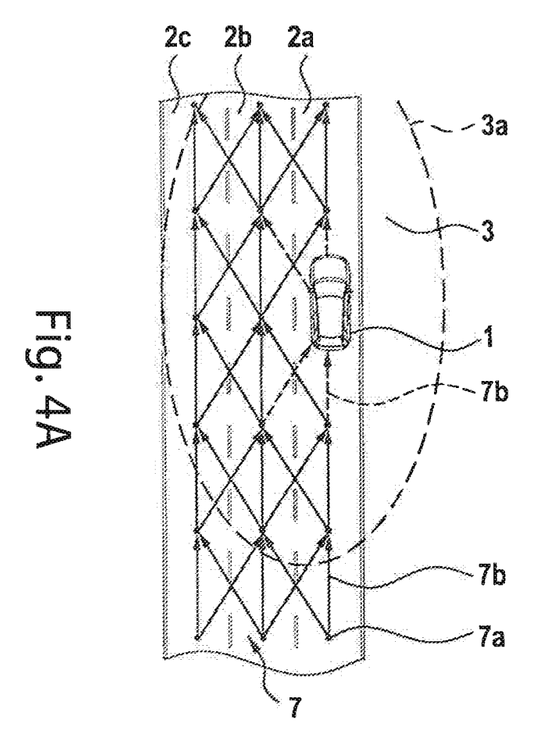
FIGS. 4A and 4B show an exemplary modeling of traffic lane 2a-2c as a graph 7.
Figure 4B:
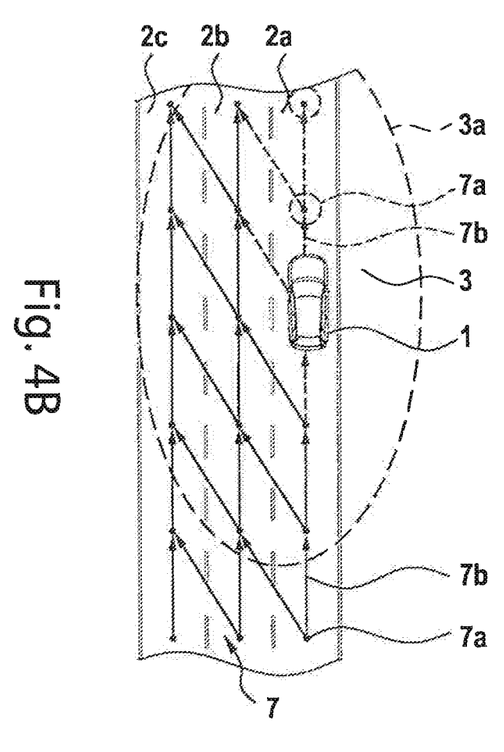

FIG. 4 shows the modeling of the reachability in an exemplary manner by graph 7, in which nodes 7a denote vehicle positions and edges 7b denote possible vehicle movements. Nodes 7a and edges 7b, which are blocked by existing vehicles 1, 4 and/or 6, are sketched as dashed lines in each case. The graphs are drawn purely spatially; the time dimension is not drawn in for reasons of clarity.

FIG. 4A includes all possible edges 7b. FIG. 4B has been simplified insofar as only a stay in current traffic lane 2a, 2b, 2c and a lane change to the left are permitted for internal other vehicle 4 and for external other vehicle 6. This illustrates that the drivers of other vehicles 4, 6 behave cooperatively with respect to ego vehicle 1.

In FIG. 5, different scenarios have been translated into the graph model illustrated in FIG. 4B.

Figure 5A:
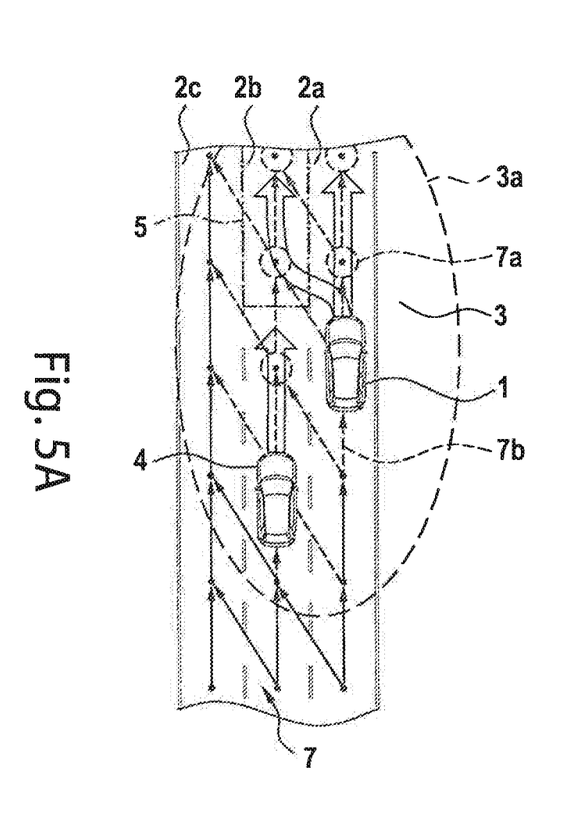
FIGS. 5A, 5B, 5C and 5D show exemplary assessments of the danger potential on the basis of graph 7.

FIG. 5A shows the scenario illustrated in FIG. 3A in the form of a graph. Internal other vehicle 4 occupies center traffic lane 2b and thus prevents a possibly fast external other vehicle 6 in this traffic lane 2b from entering target region 5 of the lane change intended by ego vehicle 1. Such an external other vehicle 6 is also not able to pass internal other vehicle 4 on the right and reach target region 5 in this way; when attempting to do so, external other vehicle 6 would either rear-end ego vehicle 1 or come into conflict with internal other vehicle 4. According to the assumption made in FIG. 4B, the external other vehicle—in the event that it would pass internal other vehicle 4 on the left—would also not return to center lane 2b. A fast external other vehicle 6 is therefore unable to reach target region 5 no matter what route it may take. The lane change of ego vehicle 1 from left lane 2a to center lane 2b is permitted.

Figure 5B:
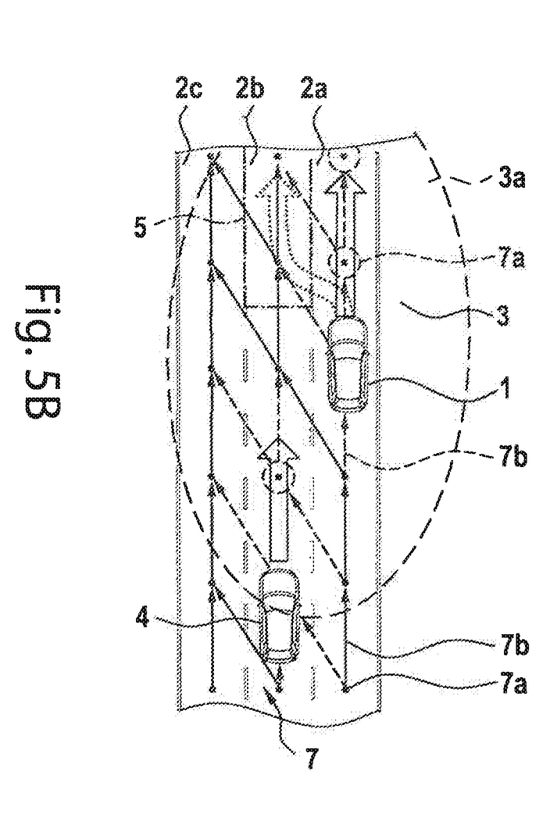

According to FIG. 5B, the situation changes considerably if the distance between internal other vehicle 4 and ego vehicle 1 is slightly greater. The greater distance suggests safety but allows a possible fast external other vehicle 6 to pass internal other vehicle 4 on the right and to change back to the left into center traffic lane 2b. External other vehicle 6 may thereby end up in target region 5 and thus come into conflict with ego vehicle 1 changing thereto. The lane change is therefore prevented (dashed arrow from ego vehicle 1 to target region 5).

Figure 5C:
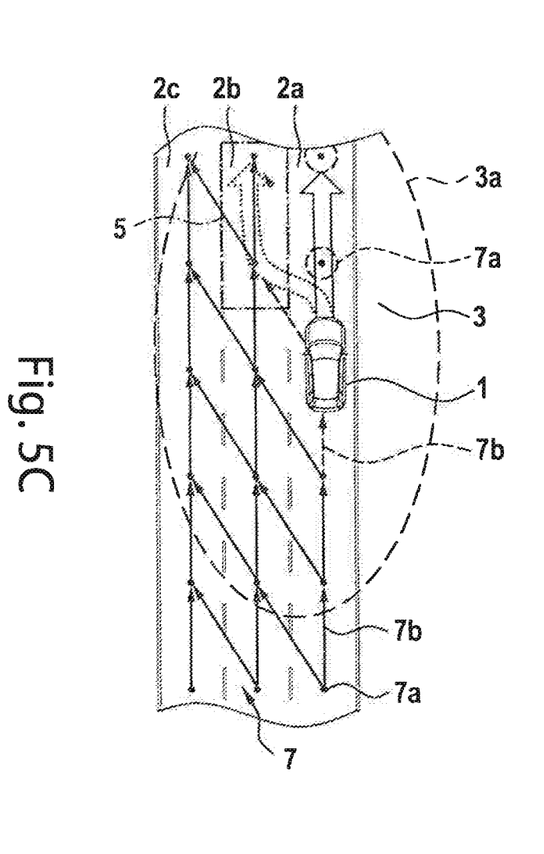

FIG. 5C represents the scenario shown in FIG. 3D in the form of a graph. If no internal other vehicle 4 is present, a fast external other vehicle 6 is able to reach entire center traffic lane 2b. A change to this traffic lane 2b is therefore not safe for ego vehicle 1.

Figure 5D:
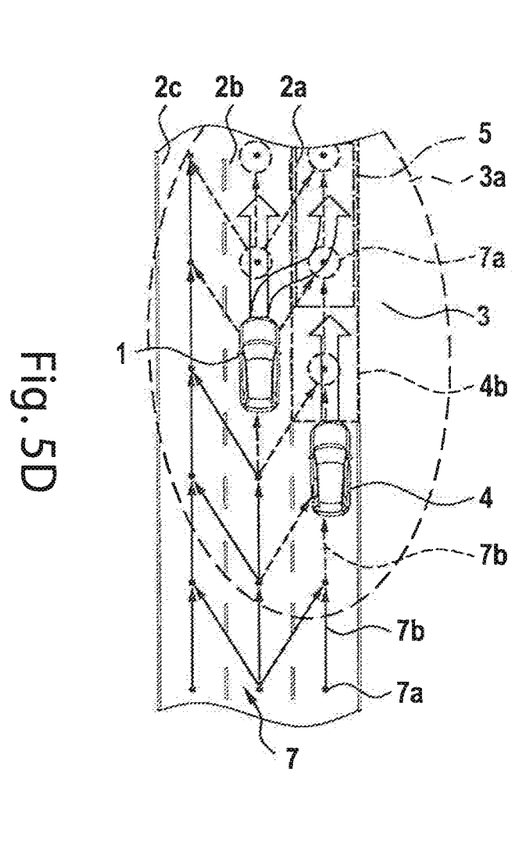

FIG. 5D shows a scenario in which ego vehicle 1 in center traffic lane 2b passes an internal other vehicle 4 driving in right traffic lane 2a. Region 4b directly in front of internal other vehicle 4, and thus also destination region 5, is unable to be entered by any external other vehicle 6. As a result, it is safe for ego vehicle 1 to switch back to right traffic lane 2a after completing the passing maneuver. In this instance, no conflict arises with internal other vehicle 4 since ego vehicle 1 is faster.

What is claimed is:

1. A method for ascertaining a danger potential of a lane change of a vehicle from a currently used traffic lane to an adjacent traffic lane, the method comprising:
   monitoring a detection range in an external space of the vehicle;
   evaluating an effect of objects identified in the detection range on the danger potential being evaluated; and
   evaluating, on the basis of positions and speeds of one or more internal other vehicles identified in the detection range, whether an external other vehicle located outside the detection range is able to reach a target region in which the vehicle is located following an intended lane change, wherein the target region is evaluated as being reachable by the external other vehicle when each of the one or more internal other vehicles are identified at such a great distance that the external other vehicle is able to pass the one or more internal other vehicles and merge into the adjacent traffic lane even before reaching the target region; and
   preventing the lane change when the external other vehicle is able to reach the target region.

2. The method as recited in claim 1, wherein the target region is evaluated as being reachable by the external other vehicle when no internal other vehicle is identified in the adjacent traffic lane between the target region and a boundary of the detection region.

3. The method as recited in claim 1, wherein a predefined region behind an internal other vehicle driving in front in the adjacent traffic lane is evaluated as being not reachable, or as being reachable to a limited extent, by the external other vehicle.

4. The method as recited in claim 1, wherein a predefined region in front of an internal other vehicle which has been passed by the vehicle is evaluated as not being reachable by the external other vehicle.

5. The method as recited in claim 1, wherein the traffic lane is modeled as a graph in which nodes represent positions of vehicles and in which edges represent possible movements of vehicles.

6. The method as recited in claim 5, wherein the graph is a spatiotemporal graph in which the nodes represent the positions of vehicles at certain points in time.

7. The method as recited in claim 1, wherein an intention of a driver of the vehicle to undertake a lane change is detected and a warning is output to the driver when the danger potential exceeds a predefined threshold value.

8. The method as recited in claim 7, wherein an optical range is monitored in a direction of possible external other vehicles and the warning is output only if the optical range ends inside the detection range.

9. The method as recited in claim 1, further comprising permitting the lane change when the external other vehicle is not able to reach the target region.

10. A method for the at least partially automated control of a vehicle, the method comprising:
    ascertaining a danger potential of a lane change of the vehicle from a currently used traffic lane to an adjacent traffic lane, the ascertaining including:
      monitoring a detection range in an external space of the vehicle,
      evaluating an effect of objects identified in the detection range on the danger potential being evaluated, and
      evaluating, on the basis of positions and speeds of one or more internal other vehicles identified in the detection range, whether an external other vehicle located outside the detection range is able to reach a target region in which the vehicle is located following an intended lane change, wherein the target region is evaluated as being reachable by the external other vehicle when each of the one or more internal other vehicles are identified at such a great distance that the external other vehicle is able to pass the one or more internal other vehicles and merge into the adjacent traffic lane even before reaching the target region; and
    preventing the lane change when the external other vehicle is able to reach the target region.

11. The method as recited in claim 10, wherein the target region is evaluated as being reachable by the external other vehicle when no internal other vehicle is identified in the adjacent traffic lane between the target region and a boundary of the detection region.

12. The method as recited in claim 10, wherein a predefined region behind an internal other vehicle driving in front in the adjacent traffic lane is evaluated as being not reachable, or as being reachable to a limited extent, by the external other vehicle.

13. The method as recited in claim 10, wherein a predefined region in front of an internal other vehicle which has been passed by the vehicle is evaluated as not being reachable by the external other vehicle.

14. The method as recited in claim 10, further comprising permitting the lane change when the external other vehicle is not able to reach the target region.

15. A non-transitory machine-readable storage medium on which is stored a computer program including machine-readable instructions for ascertaining a danger potential of a lane change of a vehicle from a currently used traffic lane to an adjacent traffic lane, the computer program, when executed by a computer, causing the computer to perform:
   monitoring a detection range in an external space of the vehicle;
   evaluating an effect of objects identified in the detection range on the danger potential being evaluated; and
   evaluating, on the basis of positions and speeds of one or more internal other vehicles identified in the detection range, whether an external other vehicle located outside the detection range is able to reach a target region in which the vehicle is located following an intended lane change, wherein the target region is evaluated as being reachable by the external other vehicle when each of the one or more internal other vehicles are identified at such a great distance that the external other vehicle is able to pass the one or more internal other vehicles and merge into the adjacent traffic lane even before reaching the target region; and
preventing the lane change when the external other vehicle is able to reach the target region.

16. The non-transitory machine-readable storage medium as recited in claim 15, wherein the target region is evaluated as being reachable by the external other vehicle when no internal other vehicle is identified in the adjacent traffic lane between the target region and a boundary of the detection region.

17. The non-transitory machine-readable storage medium as recited in claim 15, wherein a predefined region behind an internal other vehicle driving in front in the adjacent traffic lane is evaluated as being not reachable, or as being reachable to a limited extent, by the external other vehicle.

18. The non-transitory machine-readable storage medium as recited in claim 15, wherein a predefined region in front of an internal other vehicle which has been passed by the vehicle is evaluated as not being reachable by the external other vehicle.

19. The non-transitory machine-readable storage medium as recited in claim 15, the computer programming causing the computer to further perform permitting the lane change when the external other vehicle is not able to reach the target region.

\* \* \* \* \*